US005966410A

United States Patent [19]
Freyman et al.

[11] Patent Number: 5,966,410
[45] Date of Patent: Oct. 12, 1999

[54] METHOD AND SYSTEM FOR CLEANING A FREQUENCY BAND

[75] Inventors: Phillip Kent Freyman, Elgin; Gary E. Mastenbrook, Schaumburg, both of Ill.

[73] Assignee: Motorola, Inc., Schaumburg, Ill.

[21] Appl. No.: 08/678,166

[22] Filed: Jul. 11, 1996

Related U.S. Application Data

[63] Continuation of application No. 08/380,545, Jan. 30, 1995, abandoned.

[51] Int. Cl.[6] .............................. H04K 27/20; H04L 1/02
[52] U.S. Cl. ................................ 375/296; 348/7; 348/13; 455/6.2
[58] Field of Search .................................. 375/296; 348/6, 348/8, 10, 11, 12, 13, 7; 455/5.1, 3.1, 4.1, 4.2, 6.2; 333/12, 165, 166, 178

[56] References Cited

U.S. PATENT DOCUMENTS

| | | | |
|---|---|---|---|
| 4,272,721 | 6/1981 | Rifken | 358/118 |
| 4,450,481 | 5/1984 | Dickinson | 358/114 |
| 4,496,986 | 1/1985 | Lubchenko et al. | 358/118 |
| 4,518,993 | 5/1985 | Okada et al. | 455/176 |
| 4,771,456 | 9/1988 | Martin et al. | 380/10 |
| 4,930,120 | 5/1990 | Baxter et al. | 348/8 X |
| 5,126,840 | 6/1992 | Dufresne et al. | 358/86 |
| 5,249,043 | 9/1993 | Grandmougin | 348/8 |
| 5,355,162 | 10/1994 | Yazolino et al. | 348/8 X |
| 5,528,582 | 6/1996 | Bodeep et al. | 370/24 |
| 5,557,319 | 9/1996 | Gurusami et al. | 348/11 |
| 5,737,461 | 4/1998 | Sanders et al. | 385/27 |

*Primary Examiner*—Chi H. Pham
*Assistant Examiner*—Bryan Webster
*Attorney, Agent, or Firm*—Hugh C. Dunlop

[57] ABSTRACT

A cable system (10) has a plurality of CAUs (34) coupled to a variety of network devices (58–68) in the subscriber's premise (36). The network devices (58–68) transmit signals to the CAU (34) in a clear frequency (100). The signals are coupled to a filter (70) which blocks any ingress noise from the premise (36). The filter (70) is coupled to a mixer (76), which down converts the signals from the clear frequency (100) to a desired frequency (104). Upstream signals in a bypass band (102) are coupled from the network devices to a low pass filter (72). The signals are then combined with the downconverted signals and transmitted into the cable system (10).

28 Claims, 2 Drawing Sheets

METHOD AND SYSTEM FOR CLEANING A FREQUENCY BAND

This is a continuation of application Ser. No. 08/380,545, filed Jan. 30, 1995 and now abandoned.

FIELD OF THE INVENTION

The present invention relates generally to the field of communications and more particularly to a method and system for clearing a desired frequency band.

BACKGROUND OF THE INVENTION

Local communication networks are being designed for a wide variety of services, from telephony and broadcast television to set-top boxes, videophones and information services such as the internet. Providing these new services results in a new set of challenges to telephone and cable companies. Cable companies will have to design systems that can provide two way communication. While telephone companies will have to design a system which can simultaneously handle a variety of broadband signals.

Most likely these new services will all be provided through a single coaxial cable to the subscriber's premise. Inside the subscriber's premise a splitter will fan out a number of cable lines to the various devices needing connection to the cable system. The subscriber will be responsible for cabling within his premise, which will require a variety of splitters, connectors and couplers. Each splitter, connector and coupler is a potential source for ingress noise into the cable system. Any damage to the cable's shielding is another potential source for ingress noise.

Present, CATV systems have allocated the 5–42 MHz band for upstream signals (i.e., signals originating from the subscriber's premises). In this frequency band a wide variety of noise source exist. These include CB radios, low frequency police radios, and electromechanical devices, such as mixers. As a result, there exists an ingress noise concern for local communications networks providing a wide variety of interactive services.

One solution is to require high quality cabling within the user's premises. If all the connections were tight all the time and used high quality connectors and all unused terminals were terminated and there was no damage to the cables shielding, this would be an effective solution. However, traditionally the cabling within the subscriber's premise belongs to the subscriber and therefor it is difficult to monitor the quality and condition of the cabling.

A typical solution to noise problems in a communication system is to filter out the noise using frequency selective filters. However, this only works if the noise is in a different frequency band than the desired signal and in this case the likely noise sources are in the same frequency band as the desired signal. Thus there exists a need for a system and method to clear the desired frequency band of ingress noise before transmission of the desired signals.

DETAILED DESCRIPTION OF THE DRAWINGS

In summary the invention provides a system and method for clearing ingress noise from a desired frequency band used for transmission of signals in a communication system. The invention accepts signals in a first frequency band different from the desired frequency band. Next, the noise energy in the desired frequency band is blocked. Last, the signals are converted from the first frequency band to the desired frequency band.

Figure 1:
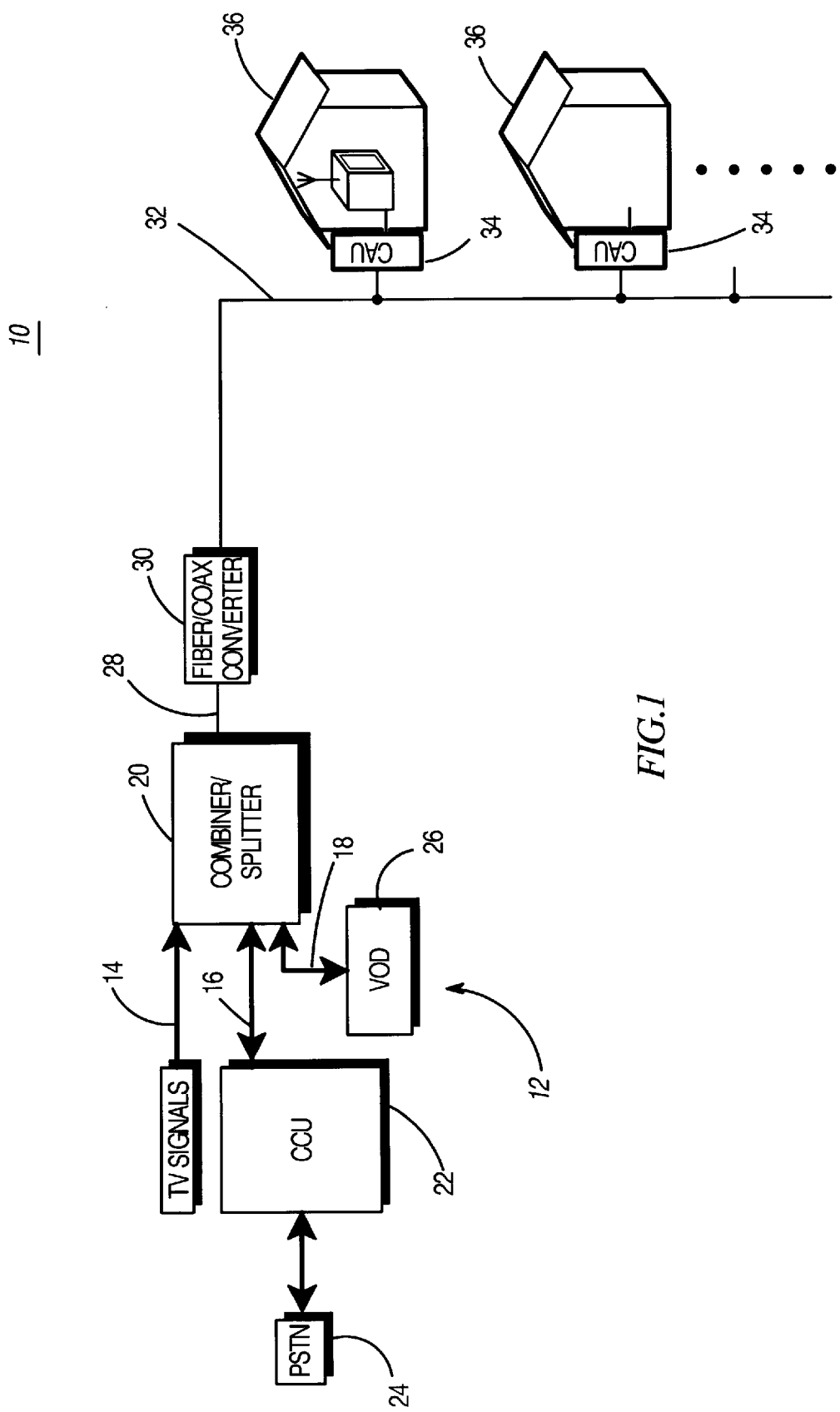
FIG. 1 is a block diagram of a cable communication system.

FIG. 1 shows a cable communication system 10 that could advantageously use the invention of this application. At the headend 12 of the communication system 10 broadcast television signals 14, telephone and data signals 16 and video on demand (VOD) signals 18 are coupled to a combiner/splitter 20. A cable control unit (CCU) 22 provides data and telephony capability to the communication system 10 and access to a PSTN 24. A video on demand (VOD) system 26 controls and originates the video services for the subscribers of the communication system 10. The signals 28 from the combiner/splitter 20 are carried by a fiber optic cable to a fiber/coax converter 30. From the fiber/coax converter 30 the signals are carried by a coaxial cable 32 to a plurality of cable access units (CAUs) 34. The CAUs 34 are attached to the outside of a subscriber's premise 36. The CAUs 34 couple to a wide variety of information devices in the premises 36, such as televisions, telephones, computers via modems, utility management devices, wireless data ports and set-top boxes.

Present cable communication systems have allocated the 5–42 MHz frequency band (5–55 MHz in Europe) for upstream signals (i.e., signals from the subscriber's premise to the headend). As stated earlier, this frequency band contains a large number of potential noise sources such as CBs, low frequency police radios, and electromechanical devices like, mixers and shavers. These noise source are coupled into the cable communication system 10 through lose connections and broken shields in the cable in the subscriber's premise 36. This noise that is coupled into the communication system 10 is called ingress noise.

Figure 2:
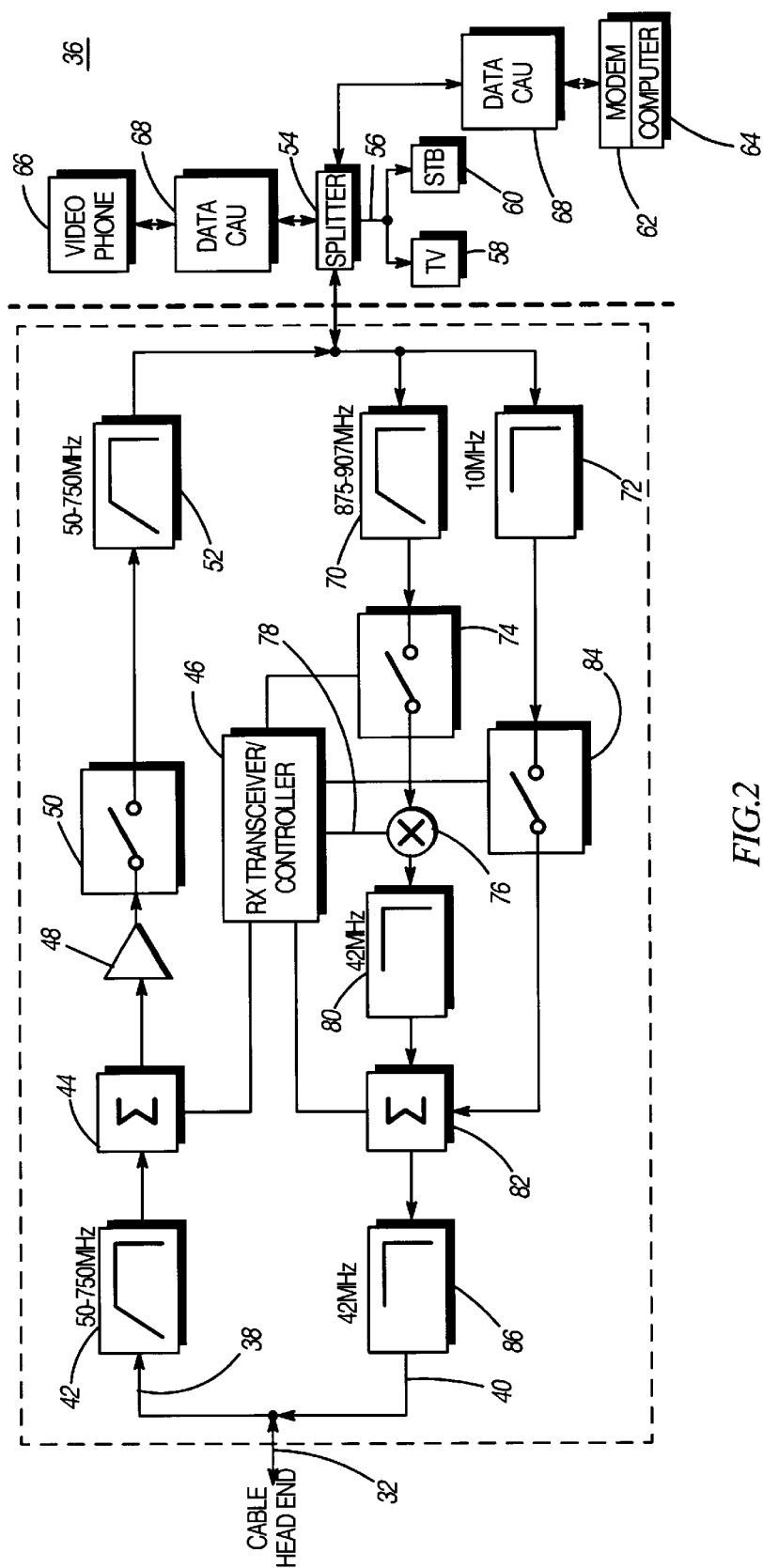
FIG. 2 is a block diagram of cable access unit and premise network device.

FIG. 2 shows a cable access unit 34 employing the system for clearing the upstream frequency band of ingress noise before transmitting of upstream signals. Once the coaxial cable 32, from the cable headend 12, enters the CAU 34 it is split into downstream signals 38 and upstream signals 40. A filter,42 is connected to the downstream signals 38 and filters out any out of band noise. The filter 42 is coupled to a splitter 44, that divides the downstream signal energy between a transceiver/controller 46 and a power amplifier 48. The transceiver/controller 46 receives and sends control information to the CCU 22. The power amplifier 48 is connected to a switch 50, that is controlled by the transceiver/controller 46. The switch 50 is connected to a filter 52, that in turn connects to a power splitter 54 in the subscriber's premise 36. The power splitter 54 is connected by a coaxial cable 56 to wide variety of information network devices, such as a television 58, a set-top box 60, a modem 62 connected to a computer 64, and a video phone 66. Other devices (not shown) which might be connected to the power splitter 54, include utility management devices which read and report the amount of gas or electricity used and wireless data ports.

Figure 3:
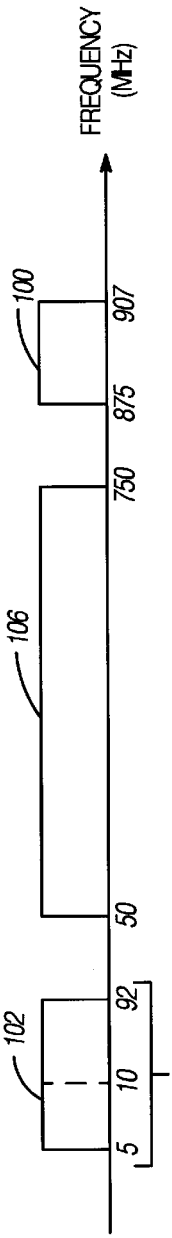
FIG. 3 is a schematic diagram of a frequency allocation scheme.

Except for the television 58, all the other devices are interactive, which means they not only receive signals they transmit signals upstream. These interactive network devices 62, 66 may be coupled to a data CAU 68. One function of the data CAU 68 is convert the upstream signals to a clear frequency spectrum 100, see FIG. 3. The upstream signals are transmitted over one of two frequency bands, either the clear frequency spectrum 100, or a bypass band 102. In the preferred embodiment, the clear frequency spectrum is from 875 to 907 MHz and the bypass band is from 5 to 10 Mhz. The upstream band 104 in the cable system 10 is allocated the 5–42 MHz band and a downstream band 106 is allocated the 50–750 MHz band.

The upstream signal energy is split and filtered by either a clear frequency filter 70 or by a low pass filter 72. The clear frequency filter 70 is then connected to a switch 74, that is controlled by the transceiver/controller 46. The switch 74 is connected to a mixer (downconverter, frequency shifter) 76, that mixes the signal with a signal 78 from a local oscillator (LO) from the transceiver/controller 46. The mixer 76 is connected to a low pass filter 80 and then to a summer 82. The low pass filter 72 is connected to a switch 84 controlled by the transceiver/controller 46 and then to the summer 82. From the summer 82 the upstream signals pass through a filter 86 and to the cable headend 12 via coaxial cable 32.

The process of clearing a desired frequency band 104 of ingress noise involves transmitting the upstream information in a clear frequency band 100. The 875–907 MHz band is selected in the preferred embodiment because there are few noise sources in this frequency band at the typical subscriber's premise 36. The upstream information is then filtered so that the energy in the desired frequency band 104 is block from entering the cable communication system 10 from the premise 36. The upstream information in the clear frequency band 100 is then frequency shifted 76 to the desired frequency band 104 for transmission over the coaxial cable 32.

The controllable switches 74 and 84 are used by the system to physically block noise if a noise source or network device 62, 66 continuously emits noise into the cable system 10. The CCU 22 would detect this upstream noise source and signal the appropriate CAU 34 to open either switch 74 or 84.

While the invention is described with respect to the problem of ingress noise' in a cable system, the invention has applications beyond this problem. For instance, the invention could be used to clear a frequency channel in a long distance telephone cable. For those skilled in the art many other alternatives, modifications and variations will be obvious. For instances, the invention could be implemented without the bypass band . Accordingly, it is intended to embrace all such alternatives, modifications and variations as fall within the spirit and broad scope of the appended claims.

What is claimed is:

1. A system comprising:
    a cable access unit receiving information transmitted in a clear frequency spectrum from an interactive network device located at a subscriber premise through a cable over a first channel;
    a filter in the cable access unit coupled to the cable, the filter blocking energy in a desired frequency band on a communication network; and
    a frequency shifter coupled to the filter shifting the first channel to a second channel in the desired frequency band for upstream transmission through the communication network to a cable headend.

2. A system according to claim 1, the filter blocking energy in a desired frequency band in the communication network to reduce ingress noise in the communication network.

3. A system according to claim 2, the frequency shifter shifting the information to a plurality of channels within the desired frequency band.

4. A system according to claim 3, the cable access unit receiving information transmitted over a plurality of channels within the clear frequency spectrum.

5. A method comprising the steps of:
    receiving information transmitted in a clear frequency spectrum from an interactive network device located at a subscriber premise through a cable over a first channel;
    blocking energy in a desired frequency band in a communication network;
    shifting the first channel to a second channel in the desired frequency band; and
    transmitting the information to a cable headend through the communication network over the second channel.

6. A method according to claim 5 wherein the step of blocking energy comprises blocking energy in a desired frequency band in the communication network to reduce ingress noise.

7. A method according to claim 6 wherein the step of shifting the information comprises shifting the information to a plurality of channels within the desired frequency band.

8. A method according to claim 7 wherein the step of receiving information comprises receiving information transmitted over a plurality of channels in the clear frequency spectrum.

9. A cable access unit comprising:
    a receiver receiving information transmitted in a clear frequency spectrum from an interactive network device located at a subscriber premise through a cable over a first channel;
    a filter coupled to the receiver, the filter blocking energy in a desired frequency band in a communication network;
    a frequency shifter coupled to the filter, the frequency shifter shifting the first channel to a second channel in the desired frequency band; and
    a transmitter coupled to the frequency shifter, the transmitter transmitting to a cable headend through the communication network over the second channel.

10. A cable access unit according to claim 9, the filter blocking energy in a desired frequency band in the communication network to reduce ingress noise.

11. A cable access unit according to claim 10, the frequency shifter shifting the information to a plurality of channels within the desired frequency band.

12. A cable access unit according to claim 11 the receiver receiving information transmitted over a plurality of channels in the clear frequency spectrum.

13. A method comprising the steps of:
    receiving information transmitted in a clear frequency spectrum from an interactive network device located at a subscriber premise through a cable having a plurality of upstream and downstream channels in a communications network;
    blocking energy in the plurality of upstream channels in the communication network;
    shifting the information from a frequency band outside the plurality of upstream and downstream channels to at least one of the plurality of upstream channels; and
    transmitting the information to a cable headend through the communication network.

14. A method according to claim 13 wherein the step of blocking energy comprises blocking energy in a desired frequency band in the communication network to reduce ingress noise.

15. A method according to claim 14 wherein the step of receiving information comprises receiving information transmitted over a plurality of channels in the clear frequency spectrum.

16. A cable access unit comprising:
- a receiver receiving information transmitted in a clear frequency spectrum from an interactive network device located at a subscriber premise through a cable having a plurality of upstream and downstream channels;
- a filter coupled to the receiver, the filter blocking energy in the plurality of upstream channels in a communication network;
- a frequency shifter coupled to the filter, the frequency shifter shifting the information from a frequency outside the plurality of upstream and downstream channels to at least one of the plurality of upstream channels; and
- a transmitter coupled to the frequency shifter, the transmitter transmitting the information over at least one of the plurality of upstream channels to a cable headend through the communication network.

17. A cable access unit according to claim 16, the filter blocking energy in a desired frequency band on the communication network to reduce ingress noise.

18. A cable access unit according to claim 17, the receiver receiving information transmitted over a plurality of channels in the clear frequency spectrum.

19. A system comprising:
- a cable access unit receiving information transmitted over at least one of a plurality of channels outside a plurality of upstream and downstream channels from an interactive network device located at a subscriber premise through a cable having a plurality of upstream and downstream channels in a communication network;
- a filter in the cable access unit coupled to the cable, the filter blocking energy in the plurality of upstream channels in the communication network to reduce ingress noise in the communication network; and
- a frequency shifter coupled to the filter the frequency shifter shifting the at least one of the plurality of channels outside the plurality of upstream and downstream channels to at least one of the plurality of upstream channels for upstream transmission through the communication network to a cable headend.

20. A system according to claim 19 wherein the filter is coupled to the frequency shifter through a switch.

21. A system according to claim 19, the filter passing the clear frequency band and a selected bypass band.

22. A system according to claim 21 wherein signals within the selected bypass band are not frequency shifted.

23. A system according to claim 19 wherein the interactive network device is selected from the group consisting of a modem, a CATV set-top box, a utility management device, a video conference box, and a wireless radio port.

24. A method comprising the steps of:
- receiving information transmitted over a plurality of channels within a clear frequency spectrum from an interactive network device located at a subscriber premise through a cable over a first plurality of channels;
- blocking energy in the second plurality of channels in a communication network to reduce ingress noise;
- shifting the first plurality of channels to a second plurality of channels within the desired frequency band; and
- transmitting the information to a cable headend through the communication network.

25. A method according to claim 24 wherein the interactive network device is selected from the group consisting of a modem, a CATV set-top box, a utility management device, a video conference box, and a wireless radio port.

26. A cable access unit comprising:
- a receiver receiving information transmitted over a plurality of channels within a clear frequency spectrum from an interactive network device located at a subscriber premise through a cable having a plurality of upstream and downstream channels in a communication network;
- a filter coupled to the receiver, the filter permitting a downstream signal to be passed from a cable headend through the cable access unit to equipment in the subscriber premises while blocking energy in a desired frequency band to reduce ingress noise;
- a frequency shifter coupled to the filter, the frequency shifter shifting the plurality of channels outside the plurality of upstream and downstream channels to the plurality of upstream channels; and
- a transmitter coupled to the frequency shifter, the transmitter transmitting the information over the plurality of upstream channels to the cable headend through the communication network.

27. A system comprising:
- a cable access unit receiving information transmitted over a plurality of channels from an interactive network device located at a subscriber premise through a cable;
- a filter in the cable access unit coupled to the cable, the filter permitting a downstream signal in a plurality of downstream channels to be passed from the cable headend through the cable access unit to equipment in the subscriber premises while blocking energy from a plurality of upstream channels in a communication network to reduce ingress noise in the communication network; and
- a frequency shifter coupled to the filter, the frequency shifter shifting the plurality of channels outside the plurality of upstream and downstream channels to the plurality of upstream channels for upstream transmission through the communication network to a cable headend.

28. A system according to claim 27 wherein the filter in the cable access unit blocks the upstream signal in the plurality of upstream channels.

* * * * *

UNITED STATES PATENT AND TRADEMARK OFFICE
CERTIFICATE OF CORRECTION

PATENT NO. : 5,966,410

DATED : October 12, 1999

INVENTOR(S) : Phillip Kent Freyman; Gary E. Mastenbrook

It is certified that error appears in the above-indentified patent and that said Letters Patent is hereby corrected as shown below:

In the title, please delete the word "Cleaning" and insert --Clearing--.

Signed and Sealed this

Eighth Day of August, 2000

Attest:

Attesting Officer

Q. TODD DICKINSON

Director of Patents and Trademarks